Jan. 28, 1958 R. PRITCHARD 2,821,627
ELECTRICAL GATING CIRCUITS
Filed April 2, 1954
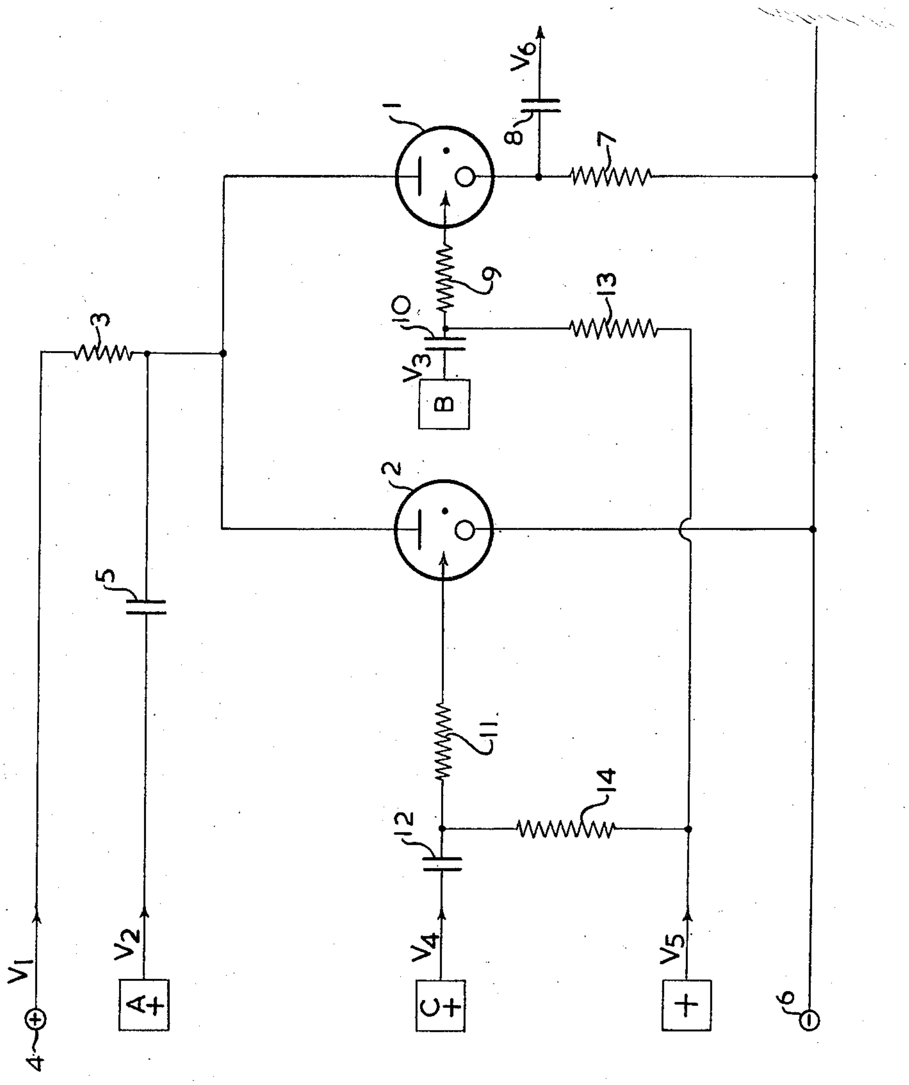
INVENTOR
RONALD PRITCHARD
BY Carl Bengt
Louis A Kline
HIS ATTORNEYS United States Patent Office 2,821,627

Patented Jan. 28, 1958

2,821,627

ELECTRICAL GATING CIRCUITS

Ronald Pritchard, Ickenham, Uxbridge, England, assignor to The National Cash Register Company, Dayton, Ohio, a corporation of Maryland Application April 2, 1954, Serial No. 420,688

4 Claims. (Cl. 250—27)

This invention relates to electrical gating circuits, that is, electrical circuits which control the passage of signals therethrough in accordance with prevailing external conditions or at predetermined time instants and comprises a single output circuit and two or more input circuits.

More particularly, the invention relates to an electronic inhibitor gate having a plurality of input circuits and an inhibiting circuit and arranged such that a coincidence of impulses applied to the input circuits will give an output except when an inhibiting impulse is applied via the inhibiting circuit.

In known inhibitor gates, a coincidence circuit for positive pulses has required negative inhibiting pulses and vice versa. Since it is more convenient to apply pulses of like polarity to both the input and inhibiting circuits, in a coincidence circuit for positive pulses requiring negative pulses for the inhibiting circuit, it is necessary to invert the positive pulses, by means such as an additional amplifying valve, in order to apply pulses having the same polarity to all the input circuits.

The object of the present invention is to provide an improved inhibitor gating circuit for use with pulses entirely of like polarity.

Thus, according to the present invention, we provide an inhibitor gate comprising electronic means having associated therewith a plurality of input circuits, an inhibiting circuit and an output circuit, and connected to the input and inhibiting circuits such that impulses of like polarity applied coincidentally thereto will inhibit output from the electronic means.

According to a further feature of the present invention, there is provided an inhibitor gate comprising a pair of electronic devices having two stable conditions of operation, each having a common input circuit and a separate input circuit, means being provided in said separate input circuits such that impulses of like polarity applied coincidentally to all three input circuits cause one device to assume a condition to prevent the other device from changing its condition and thereby inhibiting output from the gate.

In a preferred embodiment of the invention an electrical inhibitor gating circuit for control by positive pulses comprises two electronic devices having two stable conditions of operation and having a common input circuit whilst each has a separate input circuit, the arrangement being such that, when positive pulses are applied coincidentally to all three input circuits, one device assumes a condition so as to prevent the other device from operating and thereby inhibits output from said other device.

The present invention has particular application to electronic digital computing circuits and, in a preferred embodiment therefor, the inhibitor gating circuit comprises a pair of cold cathode gaseous discharge tubes having a common input circuit and each provided with separate input circuits each having impedance means located therein bearing a relationship to one another such that, when positive pulses are applied coincidentally to all the input circuits, one tube is rendered conductive and prevents conduction in the other tube.

The invention will be more clearly understood from the following description taken in connection with the accompanying circuit diagram of one embodiment of the invention.

This diagram shows a pair of electronic tubes 1 and 2 which are preferably cold cathode glow discharge tubes each having an anode, a cathode and a trigger electrode. The anodes of the tubes are connected through a common anode resistor 3 to the positive terminal 4 of a source of anode potential $V_1$, and through capacitor 5 to a source of positive impulses $V_2$, which are preferably continuously applied. The cathodes of tubes 1 and 2 are connected to negative terminal 6, preferably connected to ground, the cathode circuit of tube 1 including a resistor 7 and having a tapping to the output circuit of tube 1 via the capacitor 8. The anode-cathode potential of tubes 1 and 2 is arranged to be below the discharge maintaining voltage.

The trigger electrode of tube 1 is connected over resistor 9 and capacitor 10 to a source B of positive pulses $V_3$, and the trigger electrode of tube 2 is connected over resistor 11 and capacitor 12 to a source C of positive inhibiting pulse $V_4$. These trigger electrodes of tubes 1 and 2 are also connected through resistors 13 and 14, respectively, to a positive biassing potential source $V_5$ which is of insufficient value to trigger either tube.

Thus, the inhibitor gate shown is provided with three input circuits, one of which is an inhibiting input circuit and is arranged such that an output voltage is developed across resistor 7 only when a certain two of the inputs are coincidental, but such that the output is inhibited when a positive pulse in the inhibitor input circuit is coincidental with positive impulses applied over the other two input circuits.

The operation of the inhibitor gate is as follows:

Due to the anode bias on the tubes and the absence of starting conditions therein, the application to the anodes of impulses $V_2$ only, derived from source A, is insufficient to cause either tube to strike. However, the bias on the starting electrodes is such that the application of either positive impulses $V_3$ to the trigger electrode of tube 1 or positive inhibiting impulses $V_4$ to the trigger electrode of tube 2 is sufficient to initiate the auxiliary discharge in tube 1 or 2 respectively, which however will cease on the termination of the impulses.

If an impulse $V_2$ occurs coincidentally with impulse $V_3$, the auxiliary discharge in tube 1 will occur simultaneously with the raising of the anode potential and tube 1 will strike; the consequent increase in cathode potential being transmitted over capacitor 8 as a positive potential impulse $V_6$.

The resistors 9 and 11 in the trigger electrode circuits of tubes 1 and 2, respectively, are arranged such that the value of resistor 11 is less than the value of resistor 9 and thus the firing constants of tube 2 will be lower than those for tube 1. When positive impulses $V_2$, $V_3$ and $V_4$ are applied coincidentally to all three input circuits, the anode potentials of both tubes will be raised at the same time and thus both tubes will be in a condition to fire, but, since the formative delay of tube 2 is less than that of tube 1, only tube 2 will fire so that the anode potential of both tubes will be reduced by an amount corresponding to the fall in anode potential across anode resistor 3, that is, below a valve at which tube 1 can fire. Thus, the presence of a coincidental inhibiting impulse from source C prevents tube 1 from firing so that no output voltage appears in the output circuit of tube 1.

In a typical example where resistor 11 is 0.1 megohms and resistor 9 is 3 megohms, the formative delay of tube 2 will be approximately 5 microseconds, and that of tube 1 approximately 20 microseconds.

Although the inhibitor gate of the present invention has been described using electronic discharge devices such as cold cathode gaseous discharge tubes, it is to be understood that alternative electronic devices may be used, such as thyratrons or semi-conductor devices such as transistors. Also, where electronic tubes are used, they may include shields or other auxiliary electrodes.

What is claimed is:

1. An inhibitor gate circuit comprising a pair of electronic devices interconnected for operation one at a time, a plurality of input circuits for applying impulses to said devices, a certain combination of said input circuits being connected to operate only a first one of said devices upon a coincidence of impulses on said certain combination of input circuits, a further combination of said input circuits being connected to operate a second one of said devices upon a coincidence of impulses on said further combination, an output circuit connected to the second one of said devices for supplying an output only when said second one of the devices is operated, and timing means in the input circuits to cause the first one of said devices to be preferentially operated upon a coincidence of impulses on all of the input circuits thereby inhibiting the output.

2. In inhibitor gate circuit comprising a pair of electronic devices interconnected for operation singly in cyclic or non-cyclic succession, a common input circuit for simultaneously applying impulses to both of said devices, a separate operating input circuit for applying impulses to one of said devices to render said one of the devices operative upon a coincidence of impulses on the common input circuit and the operating input circuit, an output circuit connected to said one of said devices for providing an output only when said one of said devices is operated, and an inhibitor input circuit for applying impulses to the other of said devices to cause operation thereof upon a coincidence of impulses on at least the common input circuit and the inhibitor input circuit whereby said one of the devices is rendered inoperative and the output is inhibited.

3. An inhibitor gate circuit comprising a pair of electronic devices interconnected for operation singly from a common source of supply, a plurality of input circuits for applying impulses to said devices, a first of said input circuits being connected in common to said devices, a second of said input circuits being connected to operate only one of said devices upon a coincidence of impulses on the first and second of said input circuits, a third of said input circuits being connected to operate only the other of said devices, an output circuit connected to said one of said devices to provide an output when said first one of said devices is operated, and means in said second of the input circuits to delay the operation of said one of the devices upon the coincidence of impulses applied to all of the input circuits whereby said other of the devices is operated to the exclusion of said one and the output is inhibited.

4. An inhibitor gate circuit comprising an input electron discharge tube and an output electron discharge tube, each tube having an anode, a cathode, and an input electrode, a common connection between the anodes of the input and the output tubes and a terminal adapted to receive a common source of supply, an impedance in said connection for permitting operation of the tubes only one at a time, a common input circuit for applying impulses simultaneously to said tubes, an output circuit connected to the output discharge tube for supplying an output when said output tube is operated, a second input circuit connected to the input electrode of the output tube to operate said tube upon a coincidence of impulses on the common and second input circuits, a third input circuit connected to the input electrode of said input tube, and timing means in the second and third input circuits to cause the input tube to be preferentially operated upon a coincidence of impulses on all of the input circuits thereby inhibiting the output.

References Cited in the file of this patent

UNITED STATES PATENTS

| | | |
|---|---|---|
| 2,670,445 | Felker | Feb. 23, 1954 |
| 2,688,695 | Odell | Sept. 7, 1954 |
| 2,673,293 | Eckert | Mar. 23, 1954 |